United States Patent [19]

Weiss et al.

[11] 4,096,791

[45] Jun. 27, 1978

[54] APPARATUS FOR MAKING A FRIED FORMED CHIP

[75] Inventors: Verne E. Weiss, Wayzata; Glenn M. Campbell; Gerald L. Wilson, both of Minneapolis, all of Minn.

[73] Assignee: General Mills, Inc., Minneapolis, Minn.

[21] Appl. No.: 579,748

[22] Filed: May 21, 1975

Related U.S. Application Data

[62] Division of Ser. No. 355,260, Apr. 27, 1973, Pat. No. 3,935,322.

[51] Int. Cl.² ............................................. A47J 37/12
[52] U.S. Cl. ........................................ 99/353; 99/403; 99/427
[58] Field of Search ................. 99/403, 279, 330, 336, 99/345, 352-353, 355, 359, 404, 407, 443; 425/308, 325; 426/438-439, 441, 458

[56] References Cited

U.S. PATENT DOCUMENTS

| 1,382,926 | 6/1921 | Mitchell | 426/439 |
|---|---|---|---|
| 1,485,070 | 2/1924 | Burt et al. | 99/352 X |
| 1,561,315 | 11/1925 | Enciso | 99/352 |
| 2,286,644 | 6/1942 | Pringle et al. | 426/438 X |
| 2,463,112 | 3/1949 | Kipnis | 99/404 UX |
| 3,223,024 | 12/1965 | Benson et al. | 99/404 X |
| 3,338,154 | 8/1967 | Camacho | 99/404 X |
| 3,417,713 | 12/1968 | Schwebel | 425/325 |
| 3,520,248 | 7/1970 | MacKendrick | 99/353 |
| 3,576,647 | 4/1971 | Liepa | 426/439 |
| 3,851,569 | 12/1974 | Madrid | 99/407 |
| 3,911,805 | 10/1975 | Baird | 99/404 X |

Primary Examiner—Harvey C. Hornsby
Assistant Examiner—Arthur O. Henderson
Attorney, Agent, or Firm—G. O. Enockson; L. M. Lillehaugen

[57] ABSTRACT

Apparatus for preparing a chip type snack is disclosed. The apparatus includes a section for preparing and sheeting dough, a section for cutting the dough sheet into a continuous ribbon of wide and narrow portions, a section for frying the ribbon in deep fat, and a section for severing the ribbon into individual chips.

7 Claims, 12 Drawing Figures

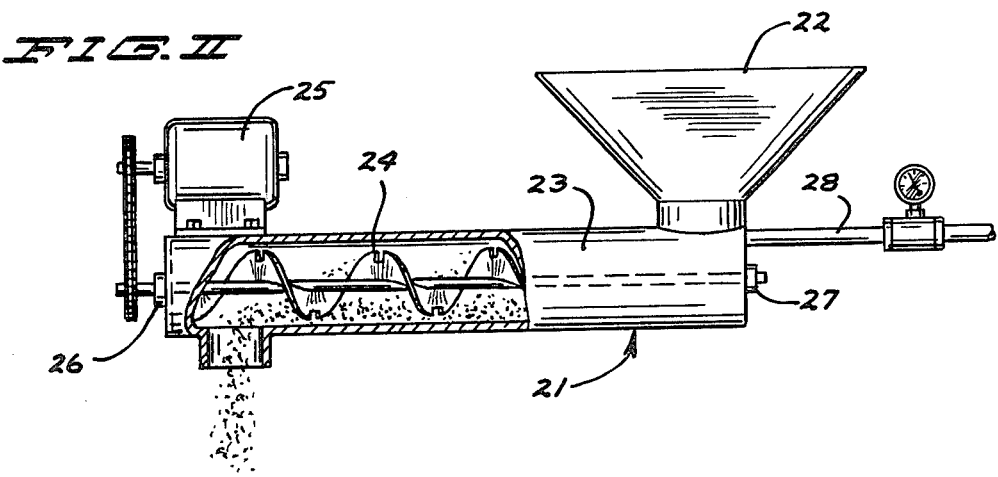
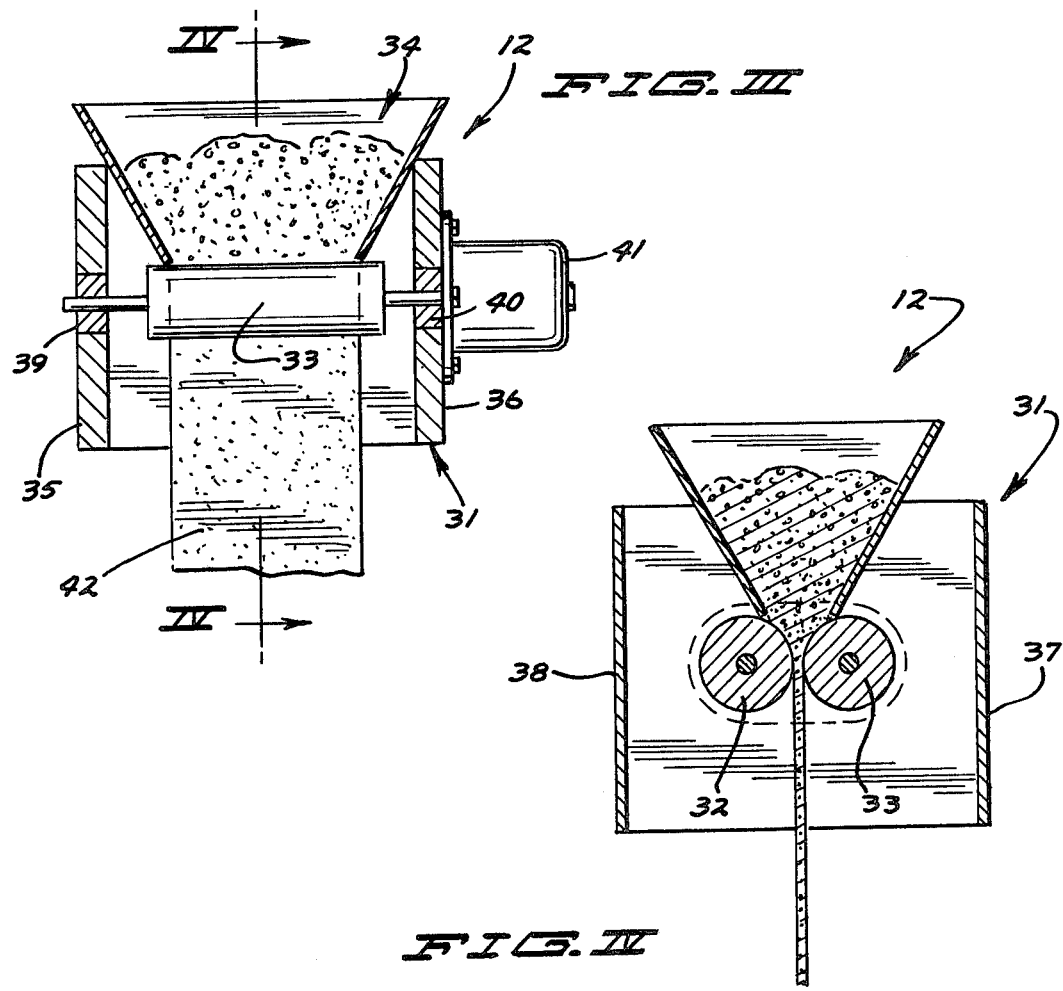

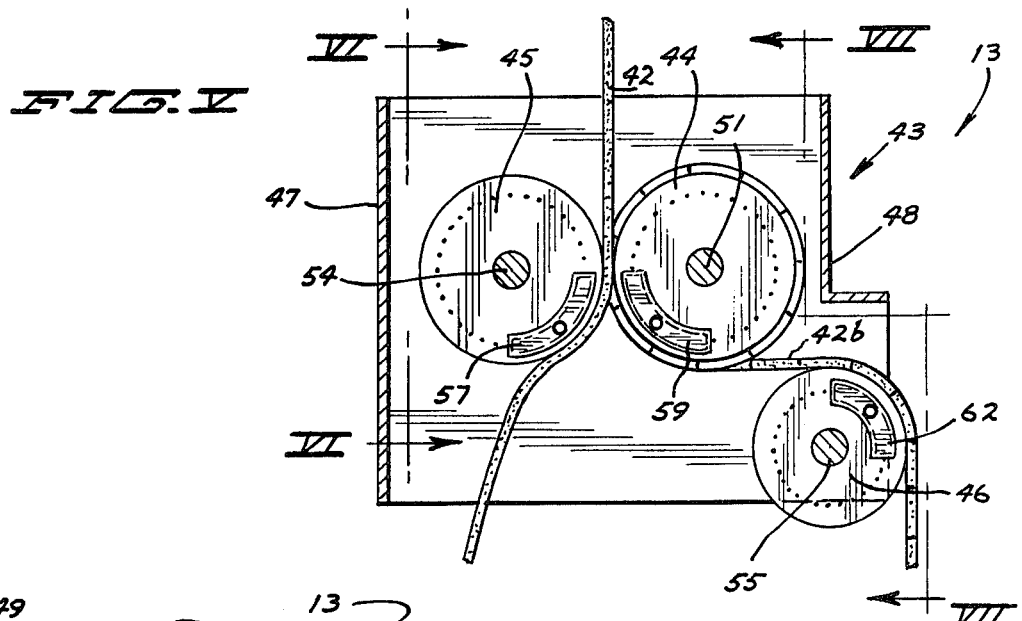
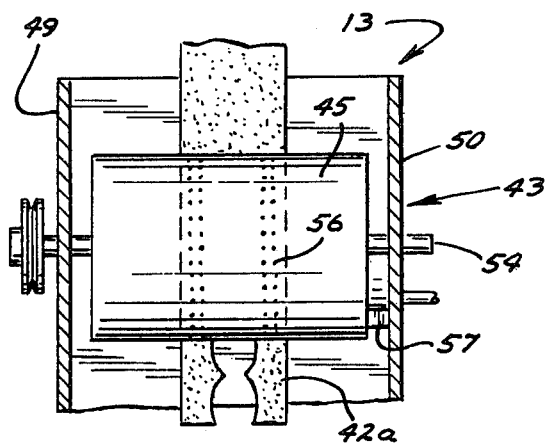
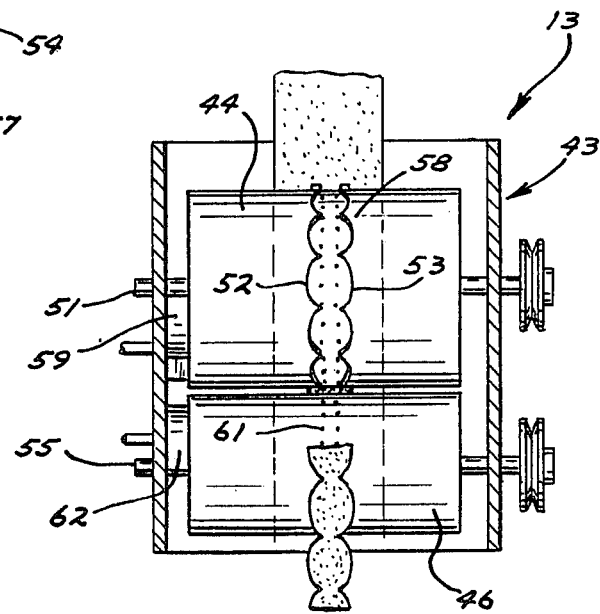

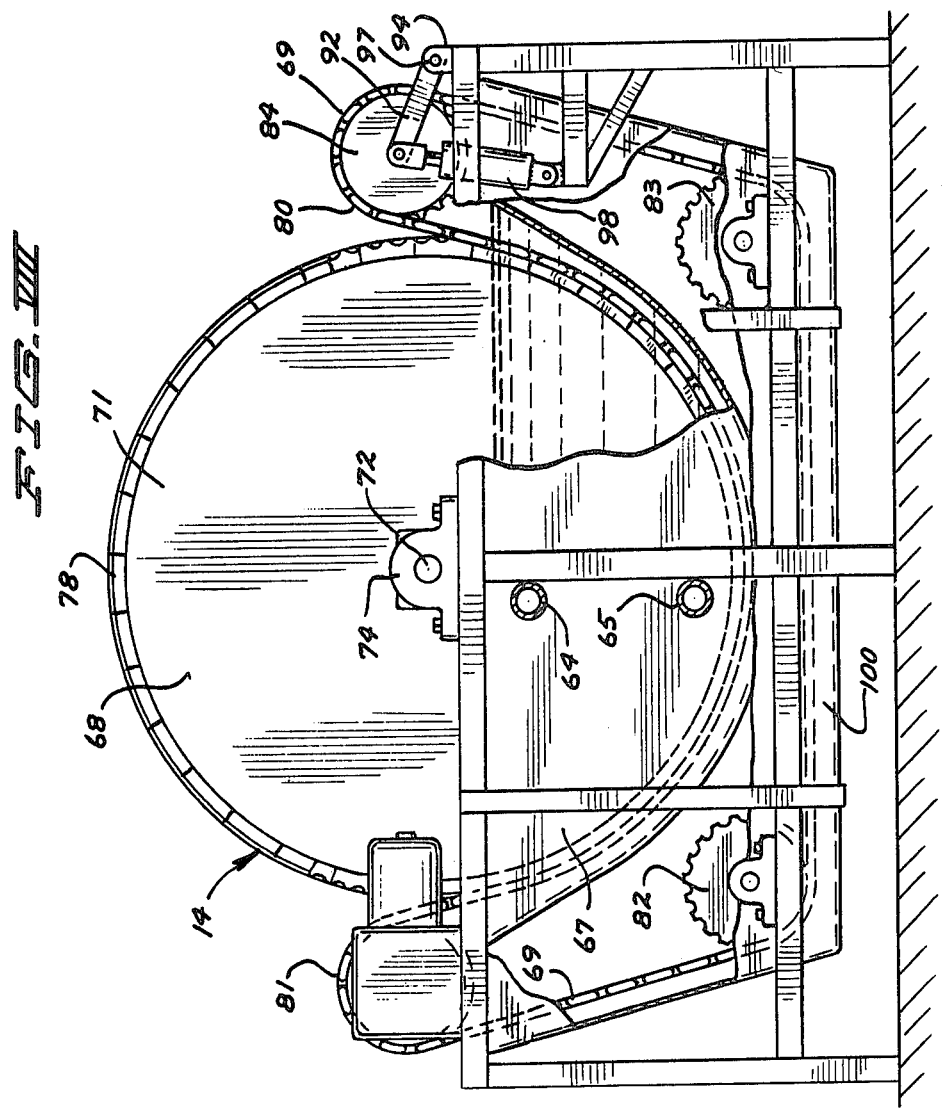
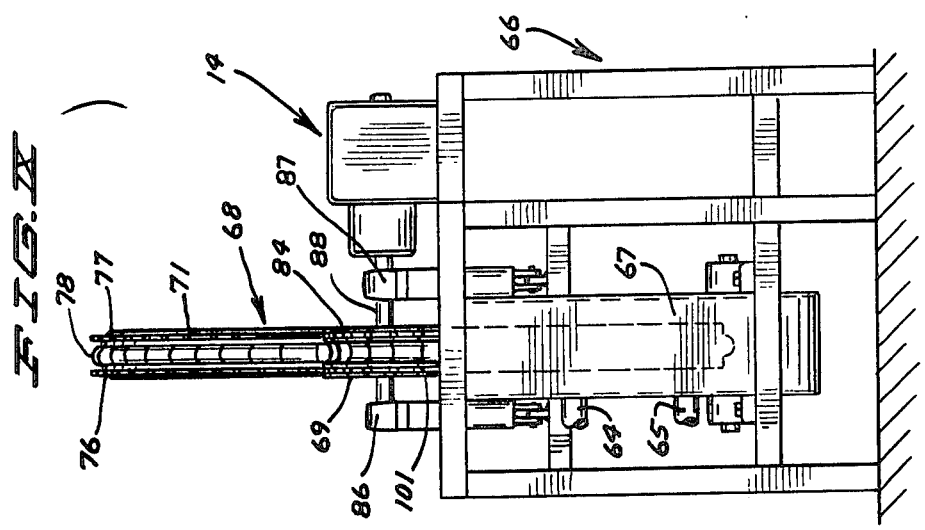

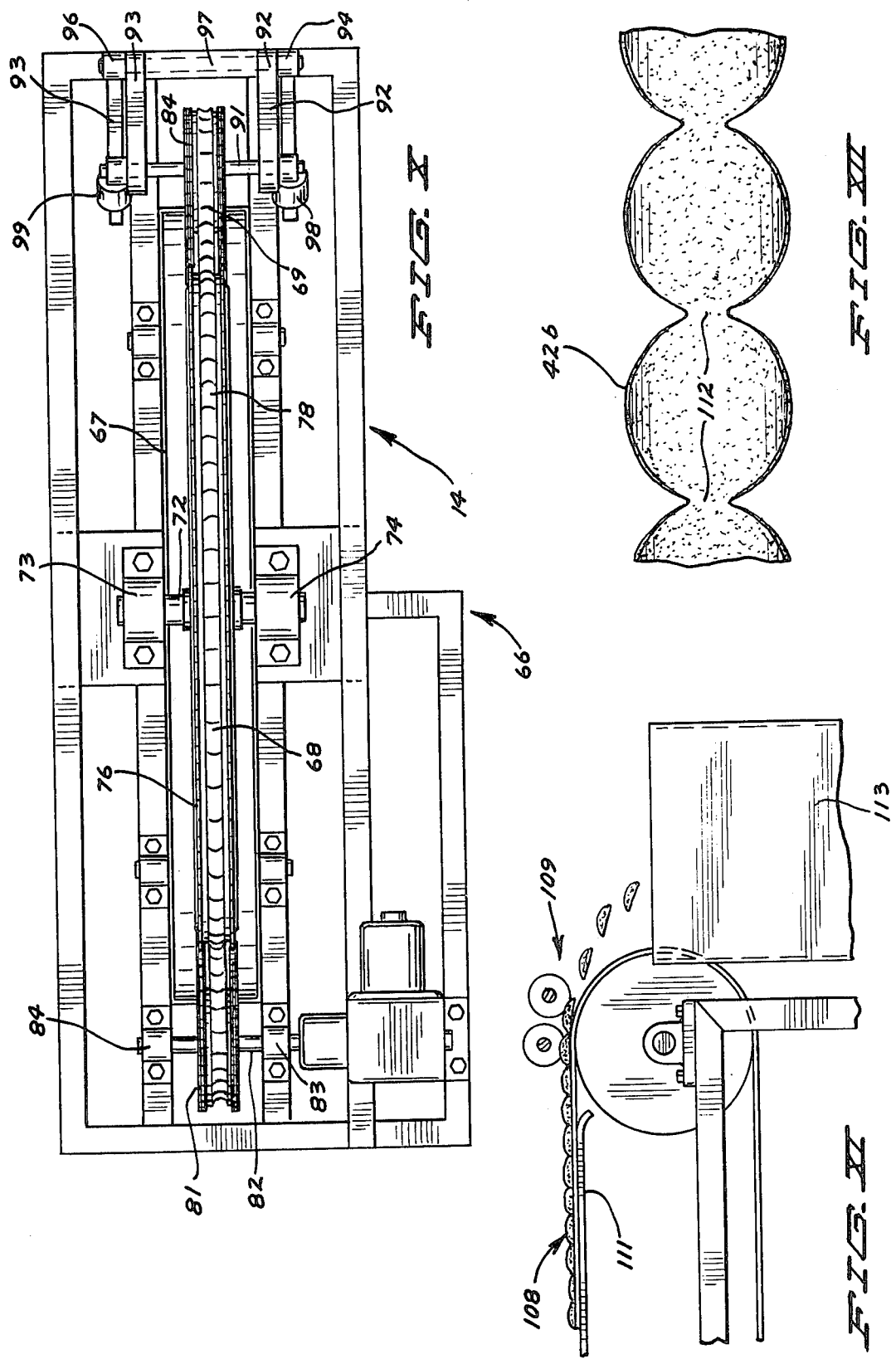

APPARATUS FOR MAKING A FRIED FORMED CHIP

This is a division of application Ser. No. 335,260, filed Apr. 27, 1973, now U.S. Pat. No. 3,935,322.

BACKGROUND OF THE INVENTION

The present invention relates to snack products and more particularly to chip-type snack products.

The food products which are sold in the general category of snack items are many and varied, typically including such things as chips (e.g., potato chips and corn chips), puffs (e.g., corn puffs), etc. Snack items account for a large volume in the food industry. Generally, snack items are eaten apart from a regular meal and often different snack items are served at the same time. When snacks are served, normally at least one chip-type snack is included. One of the most popular chip-type snacks is the potato chip or fabricated potato chip.

The present invention relates to new apparatus for preparing fabricated chip-type snacks. The present invention will be described primarily with regard to preparation of potato chips; however, it should be recognized that various other types of fabricated chips (such as corn chips or wheat chips) may be prepared using the present invention.

It has been known in the past to prepare chip-type snacks by preparing a dough sheet and cutting sections from the dough sheet. The sections are then fried to form chips. A major difficulty has been confronted in controlling the movement of the sections through the deep fat fryer. A partial solution has been provided by operating a continuous belt in the upper portion of the fryer which assists in moving the sections through the fryer. Some sections, however, may clump together resulting in unfried or only partially fried chips. Other sections may remain in the fryer too long and become overly fried or burned. The present invention overcomes such problems by providing apparatus for frying a continuous ribbon of chips which is moved positively through the system.

SUMMARY OF THE PRESENT INVENTION

The present invention includes apparatus for preparation of a dough material, sheeting and cutting the dough material into a ribbon of chips, frying the ribbon of chips and then severing the fried ribbon into individual chips.

The dough may be prepared from any of various particulate starchy food materials such as potato granules, potato flakes, wheat flour, rice flour, corn grits and the like. The dough, when preparing fabricated potato chips, may be prepared from a 1:1 mixture of potato flakes and potato granules. The dough may be prepared solely from either potato flakes or potato granules or any mixture thereof. Alternatively, the dough may be prepared from any other potato material or other farinaceous material. The dough may have various other added ingredients. The total moisture content is such that the dough has satisfactory handling characteristics. In other words, the dough has sufficient cohesiveness to stick together as a sheet but not so much adhesiveness that it sticks excessively to equipment. Water is added to the starchy food material in an amount sufficient to form a dough. The total moisture content of the dough may vary somewhat depending on the particular starchy food material being used but will preferably be in the range of 25 to 45 percent. The term "percent" and the like, as used herein, will mean by weight unless otherwise indicated. The most preferred moisture level is about 40 percent.

The dough is sheeted to any suitable thickness. The thickness typically will be about 0.025 inch; however, the preferred thickness may be in the range of 0.010 inch. A more preferred dough sheet thickness is about 0.015 to 0.06 inch. The dough sheet may be cut into any desired shape of connected dough pieces (i.e., unfried chips) such as round or oval. The pieces remain connected by a narrow portion which is large enough to permit processing of the ribbon of connected dough pieces through the fryer without separation or breakage of the ribbon. The connecting portion may be small enough to permit easy separation of the chips after removal from the fryer. The connecting portion for chips having a 1 to 2 inch diameter may typically be $\frac{1}{8}$ to $\frac{3}{8}$ inch.

The ribbon is transported through a bath of hot oil to fry the ribbon using any desired type of fryer. The moisture content during frying is reduced, for example, to less than 5 percent. Any type of frying oil may be used such as cottonseed oil, coconut oil, peanut oil and the like. The temperature of the frying oil is sufficient to fry the dough sheet to form fried chips but not so high as to burn the oil (i.e., below the smoke point of the oil). During frying, the dough is puffed or expanded and flavor is developed. The dough typically will expand about 100% in thickness during frying. In other words, the final thickness of the puffed chip may be about twice that of the unpuffed dough. The amount of expansion may be increased or decreased, if desired, such as by confining the dough. The frying oil may be at a temperature of about 250° To 410° F., preferably about 320° to 380° F., typically 350° F. The frying time will generally be about 5 to 30 seconds, preferably 8 to 20 seconds.

The ribbon is removed from the frying oil and separated into individual chips. The fried chips may be separated by any desired method, for example, by cutting them apart with a knife. The preferred approach for separating the chips is described in U.S. Pat. No. 3,937,848, application Ser. No. 355,231, filed on even date herewith, which description is incorporated herein by reference. The ribbon is permitted to become brittle or friable after removal from the fryer. In other words, the fried ribbon is pliable immediately upon leaving the fryer and becomes brittle or friable after about 5 to 10 seconds. Although the exact mechanism is not fully known, it is believe that the change from the pliable state to the friable state is a result of two factors, namely, cooling and dehydration. The change appears to be irreversible in the absence of the addition of major amounts of water. The friable chips are then separated such as by applying a moment force perpendicular to the ribbon (i.e., bending the ribbon) causing a fracture across the connecting portion.

APPARATUS OF THE PRESENT INVENTION

Apparatus of the present invention is shown in the drawings.

IN THE DRAWINGS:

FIG. 11 shows a dough preparation section for the present invention;

Figure 1:
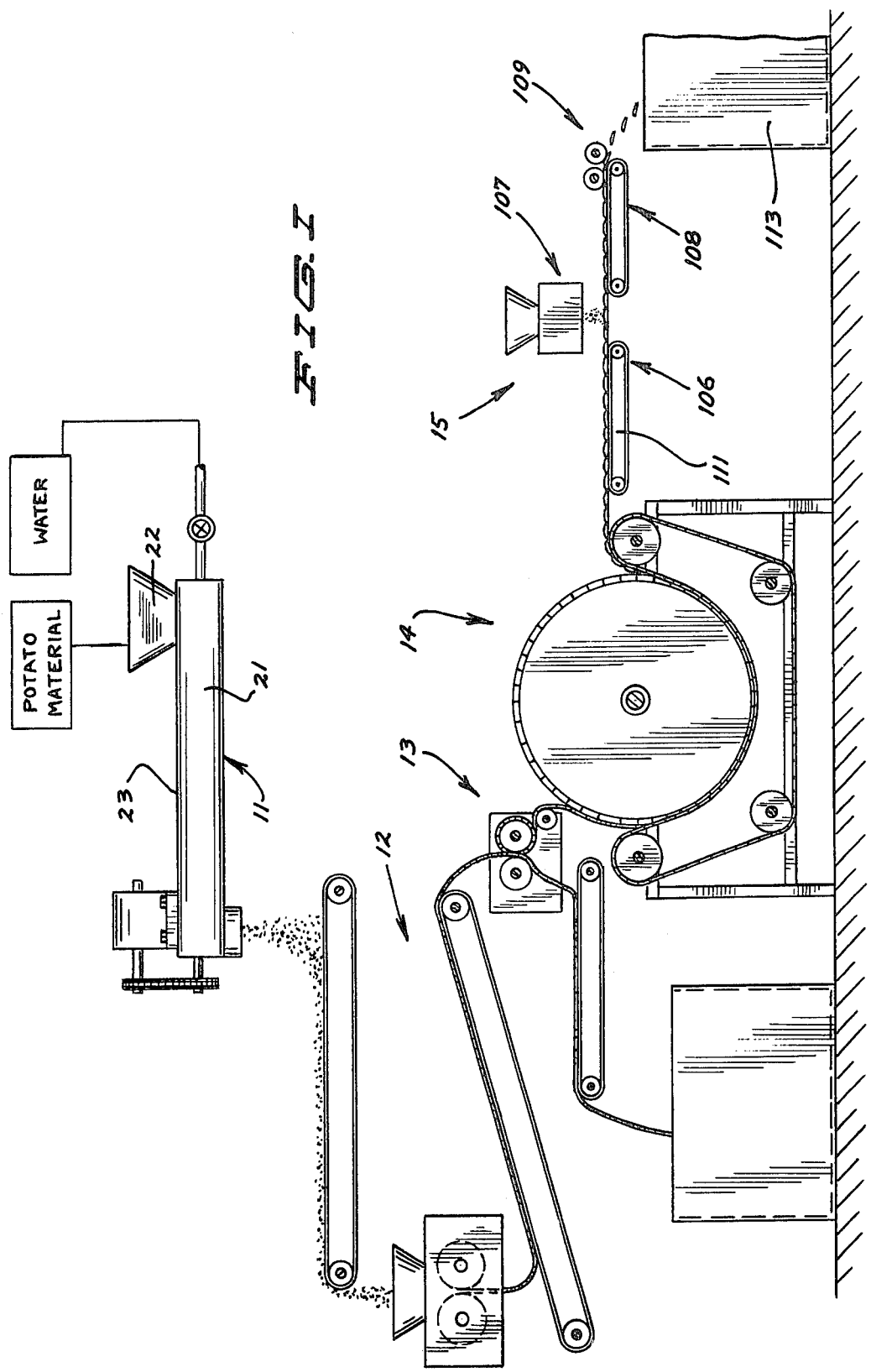
FIG. 1 shows a schematic view of apparatus for the present invention.

FIGS. III and IV show a dough sheeting section;

FIGS. V-VII show a dough cutting section for the present invention;

FIGS. VIII-X show various views of a fryer for use in the present invention;

FIG. XI shows a chip severing section for the invention;

FIG. XII shows a ribbon of connected dough pieces prior to frying.

The apparatus 10 (FIG. I) of the present invention includes a mixing section 11, sheeting section 12, cutting section 13, frying section 14 and finishing section 15.

The mixing section 11 may include any type of apparatus suitable for the preparation of a dough such as from dehydrated potato material, typically potato granules, and water. The mixing section 11 may be a continuous auger mixer 21 (FIG. II) or alternatively a paddle mixer. The auger mixer 21 may include a hopper 22, a barrel 23, a cut flight screw auger 24 and a motor 25. The screw auger 24 may be suitably supported at each end by bearings 26 and 27. The screw auger is rotatably driven by electric motor 25. The potato material may be added to the hopper 22 and is gradually pulled down into the barrel 23 by the screw auger 24. A water line 28 supplies the desired amount of water to the mixer 21. The auger 24 intimately mixes the potato material and the water to form the dough. The water is present in an amount sufficient to form a dough that will stick together or, in other words, remain cohesively fused. Preferably, the water is not present in an amount so great as to make the dough adhesive and create sticking problems during processing. The water typically may be present in an amount of from about 25 to 45 percent, preferably about 40 percent by weight, based on the total weight of the dough. The added moisture is permitted to equilibrate throughout the dough, for example, by providing a residence time for the dough in the mixer of about 5 to 10 minutes.

The dough may be sheeted using any desired sheeting apparatus such as the sheeting section 12 (FIGS. I, III and IV) which may include a support frame 31, a pair of smooth rolls 32, 33 and a hopper 34. The support frame 31 may be prepared from sheet or plate metal and includes a pair of side walls 35 and 36, as well as a front wall 37 and a rear wall 38. The rolls 32 and 33 are rotatably supported in frame 31 such as by bearings 39 and 40. The rolls 32 and 33 may be metal rolls which are rotatably driven by motor 41. The rolls 32 and 33 are spaced to provide the desired thickness of dough sheet. In the preparation of fabricated potato chips, the thickness of the dough sheet may be about 0.02 to 0.03 inch.

The dough sheet 42 may be cut into a ribbon of dough pieces with each piece remaining connected to the adjacent pieces, see FIG. XII. One type of cutting apparatus is a reciprocating punch. Another type of apparatus 13 for cutting the ribbon is shown in FIGS. V-VII and further is shown and described in U.S. Pat. No. 3,872,752, patent application Ser. No. 355,233, filed on even date herewith, which in incorporated herein by reference. The cutting apparatus 13 includes a support frame 43, a cutter roll 44, a smooth roll 45 and a transfer roll 46. The support frame 43 may be constructed of sheet metal and may include a rear wall 47, a front wall 48 and a pair of side walls 49 and 50. The cutter roll 44 may be a metal drum mounted on a shaft 51 which is rotatably supported in suitable bearings in walls 49 and 50 (not shown). The cutter roll 44 may be prepared from a metal drum by machining away the surface thereof to leave a pair of cutting ridges 52 and 53 (FIG. VII). The ridges 52 and 53 have sufficient depth to cut through the dough sheet 42. The smooth roll 45 may be a metal drum mounted on a shaft 54 which is rotatably supported in side walls 49 and 50 such as by bearinsg (not shown). The smooth roll 45 abuts against the ridges 52 and 53 of roll 44 thereby providing a cutting surface. The transfer roll 46 may be a metal drum mounted on a shaft 55 which is rotatably supported in side walls 49 and 50 such as by bearings (not shown). The rolls 44, 45 and 46 may be driven by an electric motor (not shown). If desired the rolls 44, 45 and 46 may be provided with vacuum ports for positively gripping of the dough sheet 42. The smooth roll 45, for example, may have vacuum ports 56 for gripping the waste portion 42a of dough sheet 42. A vacuum manifold 57 supplies a vacuum to ports 56 in a conventional manner. The vacuum, of course, is applied only over the zone where gripping of portion 42a is desired. The waste portion 42a may be recycled at any point prior to the sheeting section. Cutting roll 44 may have vacuum ports 58 and a vacuum manifold 59 for gripping the ribbon of chips 42b. The transfer roll 46 may have vacuum ports 61 and a vacuum manifold 62. The vacuum manifolds 57, 59 and 62 may be of conventional design. The ribbon and/or waste portion may be forcefully removed from the rolls 44, 45, and 46, such as by a blast of air.

The fryer section may be a fryer substantially like that described and claimed in U.S. Pat. No. 3,905,285, patent application Ser. No. 355,259, entitled SNACK FRYER filed on even date herewith, which description is incorporated herein by reference. Alternatively, the fryer may be of any type through which the ribbon may be passed during frying. The fryer section 14 (FIGS. VIII-X) may include a support frame 66, a frying tank 67, a conveying wheel 68 and a continuous conveying belt system 69. The support frame 66 may be constructed from any structural material such as tubing, angle iron stock and the like for example by welding. The frying tank 67 may be constructed from sheet metal and is secured in frame 66 such as by bolts (not shown).

The tank 67 has an oil inlet pipe 64 for receiving heated oil from any suitable external heater (now shown). The tank 67 has an oil outlet pipe 65 for returning such oil to the heater. Any conventional frying oil heater may be used. Such heaters are typically of two types, direct external heaters and indirect external heaters. The direct external heater applies heat, such as by a gas flame, directly to a conduit through which the oil is passing. The indirect external heater applies heat to a conduit through which a heat transfer fluid such as steam is passing. The heat transfer fluid and the cooking oil are both passed through a heat exchanger in separate conduits and the cooking oil picks up heat energy from the heat transfer fluid. The indirect external heater is preferred in the present invention. since more uniform heat is applied to the cooking oil resulting in less degradation of the oil. The heaters in either case may be of a gas fired type or of an electrical resistance type.

The conveying wheel 68 may include a metal drum 71 which is supported on a shaft 72. The shaft 72 may be rotatably mounted in a pair of bearings 73 and 74 which are secured to support frame 66. The wheel 68 may have a row of gear teeth 76 and 77 at each side (See FIG. IX) for purposes hereinafter described. The wheel 68 further includes a perforated frying surface 78 which may be provided by wire screen or perforated metal sheet.

The continuous conveying belt system 69 may include a continuous link chain 80 supported on gear wheels 81, 82, 83 and 84. Gear wheel 81 has a pair of rows of gear teeth spaced substantially the same as gear teeth rows 76 and 77 of wheel 68. Gear wheel 81 is mounted on a shaft 85 which is rotatably supported in bearings 86 and 87. The gear wheels 82 and 83 may be identical to gear wheel 81. The gear wheel 84 may be similar, however, it is mounted in such a manner that it may be pivoted to tighten link chain 80. In other words, gear wheel 84 has a shaft 91 which is rotatably mounted in bearings (not shown) in levers 92 and 93. The levers 92 and 93 are secured to the flanges 94 and 96 of frame 66 by pivot pin 97. A pair of pneumatic cylinders 98 and 99 are provided for driving the gear wheel upwardly to tighten the chain 80. The cylinders 98 and 99 are secured to the support frame 66 at the lower ends thereof and secured to levers 92 and 93 at the upper ends thereof. The link chain 80 is designed for engagement with the various gear teeth on wheels 68, 81, 82, 83 and 84. Chain 80 further includes a perforated frying surface 101 which mates with surface 78 of wheel 68. The perforated surface 101 may be provided by wire screen or perforated metal sheet which is attached to each of the links of chain 80. The surfaces 78 and 101 may be shaped the same and for example may be flat or semicircular. If the surfaces 78 and 101 are semi-circular, surface 78 may be convex and surface 101 may be concave, thereby mating with each other.

The surfaces 78 and 101 may be spaced apart typically 0.03 to 0.07 inch when frying a dough piece having a thickness of 0.02 inch. The surfaces 78 and 101 may be spaced apart typically 0.08 inch to 0.10 inch when frying a dough piece having a thickness of 0.05 inch. The perforations typically may be 1/16 inch in diameter and there are sufficient perforations per inch to provide adequate contact of the ribbon with oil during frying. A drip pan 100 may be provided to catch any oil that may drip from the belt system 69.

The finishing section 15 (FIGS. I and XI) may include a first conveyor 106, salter 107, a second conveyor 108 and a chip separator 109. The conveyors 106 and 108 may be conventional continuous belt conveyors; however, they may be provided with a plate such as 111 (FIG. XI) for supporting the upper reach of the respective belt. In the case of a shaped chip, the belt conveyors may conform to the shape of the chips. The salter 107 may be of any design suitable for metering out the desired amount of salt or other flavoring onto the row of chips. The chip separator 109 may be a wheel that impinges against the individual chips thereby resulting in a fracture across the narrow portion 112 (FIG. XII) between the chips. Such a chip separator is shown and claimed in U.S. Pat. No. 3,937,848, patent application Ser. No. 355,231. The chips then fell into a container 113.

EXAMPLE I

The present invention was carried out by mixing dehydrated potato granules and dehydrated potato flakes in a 1:1 ratio in a continuous auger mixer substantially as shown in FIG. II. The feed rate was about 236 grams per minute each of granules and flakes. The potato flakes had previously been ground so that not more than 10% were retained on a #20 U.S. Standard Sieve and not more than 15% passed through a #80 U.S. Standard Sieve. The bulk density of the flakes was about 37 pounds per cubic foot. Water was added to the mixer at the rate of 248 milliliters per minute. The retention time of the dough in the mixer was 5 to 10 minutes. After mixing, the dough was passed through a Fitzmill equipped with a size 3B screen to homogenize the dough. The dough was sheeted to 0.025 inches and cut on a rotary cutter substantially as shown in FIGS. V-VII to provide a ribbon as shown in FIG. XII. The ribbon was passed through a fryer substantially as shown in FIGS. VIII-X. The fried product was puffed to about twice its original thickness and had a tender texture and potato-like flavor. The fried ribbon was salted and broken apart into individual chips.

EXAMPLE II

Dough suitable for use in the present invention was prepared by mixing about 560 grams of a pregelatinized whole ground corn, 250 grams of water, and 10 grams of sodium chloride. The materials were mixed for about two minutes in a planetary mixer (Hobart ®) and then sheeted to a thickness of about 0.025 inches. The dough sheet was suitable for cutting into a ribbon of dough pieces and frying to produce corn chips.

EXAMPLE III

Dough suitable for use in the present invention was prepared by mixing 90 pounds of corn grits, 4.5 pounds defatted corn germ, 3.6 pounds vegetable oil, 0.9 pounds sodium chloride, 0.025 pounds of calcium hydroxide, coloring and seasoning. The mixture was fed to a James Cooker at the rate of 195 grams per minute and water was added at the rate of about 87 grams per minute. The cooked dough was suitable for sheeting and cutting into a ribbon for frying according to the present invention.

The embodiments of the invention in which an exclusive property or privilege is claimed are defined as follows:

1. Apparatus for making chip type snack products from a farinaceous dough, said apparatus comprising:
    (a) first forming means comprising a pair of rolls for forming said dough into a continuous sheet;
    (b) second forming means for forming and cutting said sheet into a continuous ribbon having alternative wide and narrow portions, said alternating wide and narrow portions defining a series of uniformly-shaped chip preforms;
    (c) frying means for frying said continuous ribbon of dough including means for constraining said ribbon in a uniform shape while frying said ribbon;
    (d) severing means for severing said fried ribbon at said narrow portions, thereby providing a plurality of uniformly-shaped fried chips; and
    (e) conveying means, including means for conveying said dough from said first forming means to said second forming means, means for conveying said ribbon from said second forming means to said frying means, means for conveying said ribbon through said frying means with a positive movement, and means for conveying said fried ribbon from said frying means to said severing means.

2. The apparatus of claim 1 wherein said second forming means comprises cutting means including a cutter roll having a pair of cutting ridges, aid cutting ridges having sufficient depth to cut through the dough sheet, said cutting means further including impingement means for fracturing said ribbon across the narrow portions thereby providing a plurality of uniformly-shaped fried chips.

3. The apparatus of claim 1 further comprising molding means for imparting a uniform mean surface curvature to said continuous ribbon.

4. The apparatus of claim 3 wherein said molding means comprises a mold disposed directly above said ribbon while said continuous ribbon is conveyed through said fryer.

5. The apparatus of claim 3 wherein said mold means includes a first substantially continuous mold surface disposed directly above said continuous ribbon and a second substantially continuous mold surface disposed directly beneath said continuous ribbon while said continuous ribbon is conveyed through said fryer.

6. The apparatus of claim 5 wherein said second mold means comprises a continuous chain.

7. Apparatus for making chip-type snack products, said apparatus comprising:
  (a) mixing means for mixing a farinaceous material and water to form a farinaceous dough;
  (b) sheeting means for forming said dough into a continuous sheet;
  (c) cutting means for cutting said sheet into a continuous ribbon of dough formed of a series of uniform round - or oval - shaped chip preforms having arcuate wide portions integrally connected to one another by narrow portions;
  (d) frying means for frying said continuous ribbon of dough;
  (e) transporting means for transporting said continuous ribbon through said frying means at a controlled rate and along a controlled path of travel with positive movement;
  (f) molding means for constraining and imparting a uniform mean surface curvature to said continuous ribbon of chip preforms;
  (g) severing means for severing said continuous fried ribbon of chip preforms at said narrow portions to provide a plurality of uniformly-shaped fried chips; and
  (h) conveying means, including means for conveying said dough from said sheeting means to said cutting means, means for conveying said ribbon from said cutting means to said frying means, means for conveying said ribbon from said frying means to said molding means, and means for conveying said fried ribbon from said molding means to said severing means.

* * * * *